(12) United States Patent
Schneiders et al.

(10) Patent No.: US 12,310,339 B2
(45) Date of Patent: *May 27, 2025

(54) NET FOR AQUACULTURE

(71) Applicant: Avient Protective Materials B.V., Geleen (NL)

(72) Inventors: Hans Schneiders, Echt (NL); Bart Tacken, Echt (NL)

(73) Assignee: AVIENT PROTECTIVE MATERIALS B.V., Geleen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,351

(22) Filed: Oct. 26, 2023

(65) Prior Publication Data

US 2024/0049691 A1 Feb. 15, 2024

Related U.S. Application Data

(63) Continuation of application No. 16/495,194, filed as application No. PCT/EP2018/058118 on Mar. 29, 2018, now Pat. No. 11,832,596.

(30) Foreign Application Priority Data

Mar. 31, 2017 (EP) .................... 17164248

(51) Int. Cl.
*A01K 61/60* (2017.01)
*D02G 3/36* (2006.01)
(Continued)

(52) U.S. Cl.
CPC ............ *A01K 61/60* (2017.01); *D02G 3/36* (2013.01); *D04B 21/12* (2013.01); *D04C 1/02* (2013.01);
(Continued)

(58) Field of Classification Search
None
See application file for complete search history.

(56) References Cited

U.S. PATENT DOCUMENTS 4,384,016 A 5/1983 Ide et al.
11,832,596 B2 * 12/2023 Schneiders ............ A01K 61/60
(Continued)

FOREIGN PATENT DOCUMENTS

CA 2799954 12/2015
CL 2013001066 1/2014
(Continued)

OTHER PUBLICATIONS

International Search Report for PCT/EP2018/058118, mailed May 28, 2018, 4 pages.
(Continued)

*Primary Examiner* — Arti Singh-Pandey
(74) *Attorney, Agent, or Firm* — NIXON & VANDERHYE P.C.

(57) ABSTRACT

Nets, preferably nets for aquaculture are provided, wherein the net comprises cords joined in a net mesh, wherein each cord comprises one or more yarns, the yarns having a tenacity of at least 0.6 N/tex and wherein the net has a mesh size of at least 8 mm, characterized in that the cords further comprise a polymeric resin, wherein the polymeric resin is a homopolymer or copolymer of ethylene and/or propylene, wherein the polymeric resin has a density as measured according to ISO1183 in the range from 860 to 970 kg/m³, a melting temperature in the range from 40 to 140° C. and a heat of fusion of at least 5 J/g. The invention further relates to a fishing net, a fish farming construction comprising said net, a fish farm, and a method for fish farming.

20 Claims, 1 Drawing Sheet

(51) Int. Cl.
    *D04B 21/12*     (2006.01)
    *D04C 1/02*      (2006.01)
(52) U.S. Cl.
    CPC .............. *D10B 2321/0211* (2013.01); *D10B 2321/022* (2013.01); *D10B 2401/063* (2013.01); *D10B 2507/02* (2013.01)

(56) References Cited

U.S. PATENT DOCUMENTS

| 2014/0202393 | A1 | 7/2014  | Robertson, Jr. et al. |
| 2016/0122919 | A1 | 5/2016  | Wagner et al. |
| 2017/0044359 | A1 | 2/2017  | Kahlen et al. |
| 2019/0320625 | A1 | 10/2019 | Ferraiolo |

FOREIGN PATENT DOCUMENTS

| CL | 2019002042 | 12/2019 |
| CN | 102418234 | 4/2012 |
| EP | 1 699 954 | 9/2006 |
| JP | 2-61146 | 3/1990 |
| JP | H06-158568 | 6/1994 |
| JP | 2001-207359 | 8/2001 |
| JP | 2005-113343 | 4/2005 |
| JP | 2014-522640 | 9/2014 |
| JP | 61-27509 | 7/2024 |
| KR | 10-2013-0050498 | 5/2013 |
| WO | 01/73173 | 10/2001 |
| WO | WO 2011/54383 | 12/2011 |
| WO | 2018/185049 | 10/2018 |

OTHER PUBLICATIONS

Written Opinion of the ISA for PCT/EP2018/058118, mailed May 28, 2018, 8 pages.
EP Appln. No. 18712925.9, Communication pursuant to Article 94(3), Mar. 11, 2021.
Notice of Reasons for Rejection, JP Appln. P2019-549557, Apr. 5, 2022.

* cited by examiner

NET FOR AQUACULTURE

CROSS-REFERENCE TO RELATED APPLICATIONS

This application is a continuation of U.S. Application Ser. No. 16/495,194 filed on Sep. 18, 2019 (now U.S. Pat. No. 11,832,596), which in turn is the U.S. national phase of International Application No. PCT/EP2018/058118 filed Mar. 29, 2018, which designated the U.S. and claims priority to EP patent application Ser. No. 17/164,248.1 filed Mar. 31, 2017, the entire contents of each of which are hereby incorporated by reference.

FIELD

The invention relates to a net, especially a net for aquaculture, preferably for use on fish farms, as well as to a method of fish farming.

BACKGROUND AND SUMMARY

With diminishing natural fish stocks efficient farming of fish (also known as aquafarming or aquaculture) within netted ocean enclosures is of great and increasing importance. In particular, the location of fish farms is becoming more varied and challenging for the industry. A problem associated with many locations desirable for fish farming is that especially the continuously submerged portions of the nets are subject to fouling. Fouling, also referred to as biofouling, is an undesirable accumulation of microorganisms, plants, algae, and other organisms on marine and other structures residing for a prolonged time in water such as said portion of netting. By water herein is understood fouling water, i.e. water which has fouling properties, such as seawater or fresh water of rivers and the like. There are mainly two categories of fouling: (i) microfouling, sometimes referred to as slime formation, which is the formation of biofilms and/or bacterial adhesion; and (ii) macrofouling, which is the attachment to said structure of larger organisms, such as barnacles, teredos, tubeworms, algae, mussels, polychaete worms, bryozoans, and seaweed. First the microfouling takes place and is subsequently followed by the formation of macrofouling.

It has been found that many types of nettings when exposed to sea and fresh waters, may experience heavy levels of clogging due to macrofouling. Such clogging may limit the flow of water and it usually makes the nettings inordinately heavy, with weight increases as high as 1000%. Natural food penetration, acceptable oxygen levels, removal of fish wastes and detritus removal may be severely restricted, leading to loss of or poor crop yield in aquaculture.

Antifouling compounds in the form of additives, coatings or metal wires have been used for decades with only partial success. Traditional antifouling coating treatments have relied on copper oxide and mercury compounds and other heavy metal compounds which are effective antifoulants, but are highly toxic and can be damaging to the aquatic life. Satisfactory alternative antifouling solutions are not yet available or are only effective for a limited time span.

It is hence common practice in the aquaculture industry that nets are subjected to frequent cleaning work such as on shore or off shore high pressure cleaning to remove microfouling and/or macrofouling but with detrimental effect on the coating applied to the net. Furthermore, the applied cleaning treatments negatively affect the net integrity by reducing the strength of the cords and meshes resulting in potential breakages and loss of fish.

An aim of the present invention may thus be to provide a net, preferably a net for aquaculture, which mitigates the above-mentioned disadvantages and in particular is less affected by repeated cleaning. A further aim of the invention may be to provide a net having a higher strength efficiency and strength retention.

Moreover, although having some resistance against micro- and macrofouling, the nettings of known aquaculture pens residing in water for prolonged time show a rather rapid slime formation and subsequently a progressive increase of macrofouling with all disadvantages associated therewith. A further aim of the present invention may thus be to provide a net for aquaculture, which is less affected by fouling.

DETAILED DESCRIPTION

Figure 1:
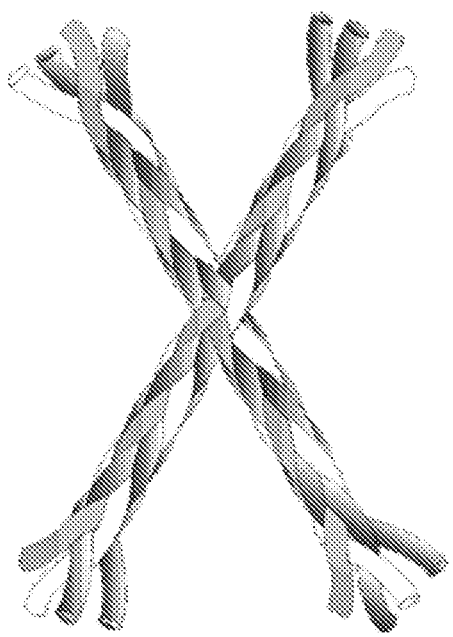
FIG. 1 shows a net construction according to an embodiment using braided cords.

The invention provides a net comprising cords joined in a net mesh, wherein each cord comprises one or more yarns having a tenacity of at least 0.6 N/tex and wherein the net has a mesh size (knot center to knot center) of at least 8 mm, characterized in that the cords further comprise a polymeric resin, wherein the polymeric resin is a homopolymer or copolymer of ethylene and/or propylene, wherein the polymeric resin has a density as measured according to ISO1183-2004 in the range from 860 to 970 kg/m$^3$, a melting temperature in the range from 40 to 140° C. and a heat of fusion of at least 5 J/g.

It was observed that the net for aquaculture of the invention shows a higher retention of strength after cleaning allowing for frequent and/or severe cleaning without the net showing visual or mechanical signs of damage. In particular, it was observed that when the net of the invention is subjected to a pressure washing, also referred to as hydro-cleaning or hydro-jet cleaning, the mesh breaking strength of the net was substantially maintained as compared to the original strength before the cleaning treatment. Also, said net provides an aqueous surrounding that is non-toxic and provides an ECO+ environment for breading, growing and sheltering aquatic life, effectively preventing thus toxic compounds, such as those leaking from known antifouling compositions, from entering the food chain.

By yarn is understood for the purpose of the invention an elongated body containing a multitude, preferably at least 10, more preferably at least 100 individual fibers. By fiber is herein understood an elongated body, the length dimension of which is much greater than the transverse dimensions of width and thickness. Accordingly, the term fiber includes filament, strip, band, tape, and the like having regular or irregular cross-sections. The fiber may have continuous lengths, known in the art as filament or continuous filament, or discontinuous lengths, known in the art as staple fibers. In a preferred embodiment of the invention the one or more yarns comprise filaments and/or staple fibers. Preferably the fibers are synthetic fibers, in particular high performance polyolefin fibers, more in particular high performance polyethylene (HPPE) fibers and most particular the HPPE fibers being ultrahigh molecular weight polyethylene (UHMWPE) fibers. It was also observed that when the net for aquaculture was manufactured from polyethylene fibers the net showed an increased resistance to pressure cleaning by less polymeric resin being removed from the net during cleaning. Hence, in an embodiment, the yarns present in the net of the of the invention contain synthetic fibers, more preferably high performance polyethylene fibers. In most preferred embodiment, the yarns of the net of the invention contain UHMWPE fibers.

Preferred synthetic fibers are those manufactured from polymers including: polyesters, e.g. polyethyltherephthalate (PET); polyamides, e.g. polyamide 6 (PA6) and polyamide 6,6 (PA66); polyaramides, e.g. poly(p-phenylene terephthalamide); poly(tetrafluoroethylene) (PTFE); aromatic copolyamid (co-poly-(paraphenylene/3,4'-oxydiphenylene terephthalamide)); poly{2,6-diimidazo-[4,5b-4',5'e] pyridinylene-1,4(2,5-dihydroxy)phenylene}; poly(p-phenylene-2, 6-benzobisoxazole) (PBO); thermotropic liquid crystal polymers (LCP) as known from e.g. U.S. Pat. No. 4,384,016; but also polyolefins e.g. homopolymers and copolymers of polyethylene and polypropylene. Also, combinations of fibers manufactured from the above referred polymers can be used in said netting.

The yarns present in the cords of the inventive net have a tenacity of at least 0.6 N/tex, preferably at least 0.8 N/tex, more preferably at least 1.2 N/tex, even more preferably at least 1.5 N/tex and most preferably at least 2.0 N/tex. It was observed that with increased tenacities of the yarns the diameter of the cords could be further reduced resulting in nets with reduced weight.

Preferred polyolefin fibers are fibers manufactured from homopolymers or copolymers of polypropylene or polyethylene. More preferably, the polyolefin is a polyethylene, most preferably an ultrahigh molecular weight polyethylene (UHMWPE). By UHMWPE is herein understood a polyethylene having an intrinsic viscosity (IV) of at least 3 dl/g, more preferably at least 4 dl/g, most preferably at least 5 dl/g. Preferably said IV is at most 40 dl/g, more preferably at most 30 dl/g, more preferably at most 25 dl/g. The IV may be determined according to ASTM D1601(2004) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration. Preferably, the UHMWPE fibers are gel-spun fibers, i.e. fibers manufactured with a gel-spinning process. Examples of gel spinning processes for the manufacturing of UHMWPE fibers are described in numerous publications, including WO 01/73173 and EP 1,699,954.

In the context of the present invention high performance polyethylene (HPPE) fibers are understood to be polyethylene fibers with improved mechanical properties such as tensile strength, abrasion resistance, cut resistance or the like. In a preferred embodiment HPPE fibers are fibers with a filament tenacity of at least 1.0 N/tex, more preferably at least 1.5 N/tex, more preferably at least 2.0 N/tex, even more preferably at least 2.5 N/tex and most preferably at least 3.0 N/tex. Preferred polyethylene is high molecular weight (HMWPE) or ultrahigh molecular weight polyethylene (UHMWPE). Best results were obtained when the high performance polyethylene fibers comprise ultra-high molecular weight polyethylene (UHMWPE) and have a filament tenacity of at least 2.0 N/tex, preferably at least 3.0 N/tex and more preferably at least 3.5 N/tex.

Preferably, the synthetic fibers, preferably the HPPE fibers and more preferably the UHMWPE fibers employed by the invention have titer in the range of from 0.5 to 20 dtex, more preferably from 0.7 to 10 dtex, most preferably from 1 to 5 dtex. The yarns to manufacture the nettings preferably have titer in the range of from 100 to 10,000 dtex, more preferably from 200 to 8,000 dtex, most preferably from 800 to 6,000 dtex. Preferably, yarns having a titer in the range of from 800 and 6,000 dtex and containing UHMWPE fibers and having a filament titer of between 0.5 and 20 dtex are used to manufacture the inventive nets since it was observed that for such combination, the advantages of the invention were more prominent.

The cords of the inventive net comprising the yarns may have a total yarn linear density in the range of from 1,000 to 100,000 dtex, more preferably from 1,500 to 50,000 dtex, most preferably from 2,000 to 25,000 dtex. By total yarn linear density of a cord is here understood the linear density of all the yarns present in a cross-section of said cord. The cords may have a maximum break load (MBL) of between 1 and 100,000 N, preferably between 10 and 10,000 N and most preferably between 20 and 2,000 N. Furthermore, the cords may have a tenacity at break of between 0.25 and 5 N/tex, preferably between 0.4 and 3.0 N/tex and most preferably between 0.8 and 2.5 N/tex.

In a special embodiment, the synthetic fibers used in accordance to the invention have a tape-like shape or, in other words, said fibers are tapes. Preferably said tapes are polyolefin tapes, more preferably UHMWPE tapes. A tape (or a flat tape) for the purposes of the present invention is a fiber with a cross sectional aspect ratio, i.e. ratio of width to thickness, of preferably at least 5:1, more preferably at least 20:1, even more preferably at least 100:1 and yet even more preferably at least 1000:1. The tape preferably has a width of between 1 mm and 600 mm, more preferable between 1.5 mm and 400 mm, even more preferably between 2 mm and 300 mm, yet even more preferably between 5 mm and 200 mm and most preferably between 10 mm and 180 mm. The tape preferably has a thickness of between 10 µm and 200 µm and more preferably between 15 µm and 100 µm. By cross sectional aspect ratio is herein understood the ratio of width to thickness.

Nets for aquaculture are known to the skilled person whereby in the context of the present invention these nets are not specifically limited by their dimensions, weight, construction or type and number of cords and yarns employed. The net will have a minimal mesh size of at least 8 mm, preferably at least 10 mm more preferably at least 15 mm whereby the mesh size is defined as the full mesh knot to knot distance, i.e. the distance from center to center of 2 adjacent knots of a mesh. The maximum mesh size of the net of the invention is not particularly limited and may be less than 500 mm, preferably less than 200 mm and more preferably less than 100 mm.

The construction of the cords of the nets of the invention are not specifically limited and may be amongst others braided, laid or parallel arrangements of a single or multiple yarns.

In one embodiment, the net construction comprises laid cords comprising 3 strands, each strand comprising at least one yarn.

In one embodiment, the net construction comprises cords that are braids comprising at least three yarns, preferably the braided cords comprise at least three strands each strand comprising at least one yarn. In other words the cords are braided from strands, whereby the strands may be formed by a single or multiple yarns such as depicted in FIG. 1. Preferably the strands of the cords have more than one yarn, preferably more than 2 yarns. Braids and braiding processes are well known. Commonly a braid is formed by crossing over a number of strands diagonally so that each strand passes alternately over and under one or more of the other strands to form a coherent cord. The terms braid and braiding are synonymous with plaits and plaiting.

In a preferred embodiment, the braid has an even number (preferably a multiple of 4) of strands of from 4 to 32, more preferably of from 4 to 24, more preferably 4 to 20, and most preferably the braid is a 4, 8, 12, or 16-strand braid, most preferably 4 strands.

Figure 2:
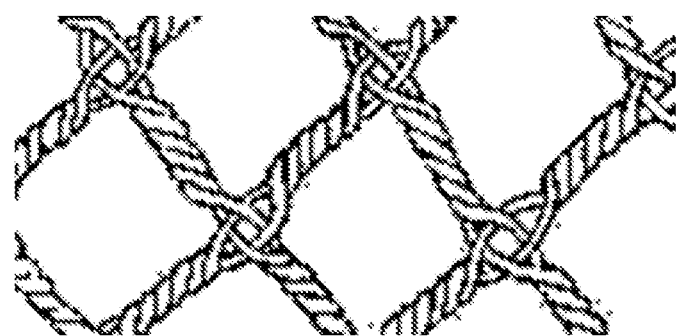
FIG. 2 shows a net construction according to another embodiment using twisted cords instead of braided cords.

An alternative but also beneficial net construction embodiment as shown in FIG. 2 comprises twisted cords instead of braided cords, in which two strands are twisted together to form a cord.

The cords of the net of the invention can be joined by standard techniques such as knots, shackles or interbraiding. It is preferred that the net of the invention is a knotless net. A knotless construction of the net results in a further improvement of the net robustness against pressure washing and especially retention of the mesh breaking strength as compared to a construction in which the cords are joint by other means such as knots or shackles.

A convenient method of constructing a braided knotless net comprising the polymeric resin is by knotless interbraiding of cords at their joining points. A braided knotless net construction is commercially available as Ultra-Cross® from NET Systems, Inc. Washington, USA, and a method of making such a net is described in Japanese Patent Publication 61-27509, the contents of which are herein incorporated by reference in its entirety.

A convenient method of constructing a twisted knotless net comprising the polymeric resin is by knotless intertwisting of cords at their joining points. A twisted knotless net construction is commercially available as Twisted-Cross® from NET Systems, Inc. Washington, USA. The polymeric resin preferably is present in substantially the whole length of each of the cords. This provides integrity as well as ease of manufacture to the net. However, the polymer resin may be incorporated only in parts of the cords, for example the parts that will be more prone to pressure washing.

According to the invention the cords of the net comprise at least one yarn and a polymeric resin. Preferably, the amount of polymeric resin present in the cords of the net is at least 0.1 wt % of the weight of the yarn present in the cord, more preferably at least 0.5 wt %, most preferably at least 1 wt %. Preferably, the amount of polymeric resin present in the cord is at most 40 wt % of the weight of the yarn, more preferably at most 30 wt %, most preferably at most 20 wt %. Preferably the cords comprise from 0.1 to 40 wt % of the polymeric resin, preferably from 0.5 to 30 wt %, more preferably 1 to 20 wt %. The weight % is determined as the weight of polymeric resin per weight of yarn present in a specific cord of the net. Said weight percentages can for example be determined by weighing the cords or nets before and after impregnating the cords or nets with the polymeric resin. Alternatively, the percentages may be determined by extracting the polymeric resin from the cords or net.

In a preferred embodiment, the polymeric resin is present in the yarns of the cords or in other words the yarns of the cord comprise said polymeric resin. Hereby is understood that the polymeric resin is not only a sheath of polymeric resin forming an outer layer of the cords, but that the polymeric resin is present throughout the cross-section of the cords and in intimate contact with the at least one yarn, i.e. with the individual yarns. In an even more preferred embodiment the polymeric resin impregnates the yarns; in other words: the polymeric resin is present throughout the cross-section of the yarn. Hereby is understood that the polymeric resin is present in between substantially all the fibers of the yarn. Preferably at least 50% of the surface of the fibers of the yarns in the cords of the net are in contact with the polymeric resin, more preferably at least 70% and most preferably 90% of the fiber surface is in contact with the polymeric resin.

A preferred embodiment of the present invention concerns a net for aquaculture wherein the net contains more than 70 wt % of HPPE fibers, preferably more than 80 wt % of HPPE fibers and most preferably more than 90 wt % HPPE fibers, whereby the wt % are expressed as mass of HPPE fibers to the total mass of the net.

The polymeric resin present in the cords of the net of the present invention has a density as measured according to ISO1183 in the range from 860 to 970 kg/m$^3$, preferably from 870 to 950 kg/m$^3$, more preferably from 880 to 930 kg/m$^3$. The inventors identified that polymeric resins with densities within said preferred ranges provide an improved balance between the abrasion resistance of the nets and the processability of the suspension coated yarns, especially during the manufacturing processes of the yarn and the nets.

The polymeric resin is a semi-crystalline polyolefin having a peak melting temperature in the range from 40 to 140° C. in accordance with and ASTM E 794-06 and a heat of fusion of at least 5 J/g, measured in accordance with ASTM E 793-85, considering the second heating curve at a heating rate of 10 K/min, on a dry sample. In a preferred embodiment of the present invention the polymeric resin has a heat of fusion of at least 10 J/g, preferably at least 15 J/g, more preferably at least 20 J/g, even more preferably at least 30 J/g and most preferably at least 50 J/g. The inventors surprisingly found that with the increase heat of fusion the cords of the net showed increased monolithic character. The heat of fusion of the polymeric resin is not specifically limited by an upper value, other than the theoretical maximum heat of fusion for a fully crystalline polyethylene or polypropylene of about 300 J/g. The polymeric resin is a semi-crystalline product with a peak melting temperature in the specified ranges. Accordingly, a reasonable upper limit for the polymeric resin is a heat of fusion of at most 200 J/g, preferably at most 150 J/g. In another preferred embodiment, a peak melting temperature of the polymeric resin is in the range from 50 to 130° C., preferably in the range from 60 to 125° C. Such preferred peak melting temperatures provide a more robust processing method to produce the cords or net in that the conditions for drying the coated nets do need less attention while nets with good properties are produced. The polymeric resin may have more than one peak melting temperatures. In such case, at least one of said melting temperatures falls within the above ranges. A second and/or further peak melting temperature of the polymeric resin may fall within or outside the temperature ranges. Such may for example be the case when the polymeric resin is a blend of polymers.

The polymeric resin present in the nets of the present invention is a homopolymer or copolymer of ethylene and/or propylene, also referred to as polyethylene, polypropylene or copolymers thereof, in the context of the present invention also referred to as polyolefin resin or polymeric resin. It may comprise the various forms of polyethylene, ethylene-propylene co-polymers, other ethylene copolymers with co-monomers such as 1-butene, isobutylene, as well as with hetero atom containing monomers such as acrylic acid, methacrylic acid, vinyl acetate, maleic anhydride, ethyl acrylate, methyl acrylate; generally α-olefin and cyclic olefin homopolymers and copolymers, or blends thereof. Preferably the polymeric resin is a copolymer of ethylene or propylene which may contain as co-monomers one or more olefins having 2 to 12 C-atoms, in particular ethylene, propylene, isobutene, 1-butene, 1-hexene, 4-methyl-1-pentene, 1-octene, acrylic acid, methacrylic acid and vinyl acetate. In the absence of co-monomer in the polymeric resin, a wide variety of polyethylene or polypropylene may be used amongst which high density polyethylene (HDPE), linear low density polyethylene (LLDPE), very low density polyethylene (VLDPE), low density polyethylene (LDPE), isotactic polypropylene, atactic polypropylene, syndiotactic polypropylene or blends thereof.

Furthermore, the polymeric resin may be a functionalized polyethylene or polypropylene or copolymers thereof or alternatively the polymeric resin may comprise a functionalized polymer. Such functionalized polymers are often referred to as functional copolymers or grafted polymers, whereby the grafting refers to the chemical modification of the polymer backbone mainly with ethylenically unsaturated monomers comprising heteroatoms whereas functional copolymers refer to the copolymerization of ethylene or propylene with ethylenically unsaturated monomers. Preferably the ethylenically unsaturated monomer comprises oxygen and/or nitrogen atoms. Most preferably the ethylenically unsaturated monomer comprises a carboxylic acid group or derivatives thereof resulting in an acylated polymer, specifically in an acetylated polyethylene or polypropylene. Preferably, the carboxylic reactants are selected from the group consisting of acrylic, methacrylic, cinnamic, crotonic, and maleic, fumaric, and itaconic reactants. Said functionalized polymers typically comprise between 1 and 10 wt % of carboxylic reactant or more. The presence of such functionalization in the resin may substantially enhance the dispersability of the resin and/or allow a reduction of further additives present for that purpose such as surfactants.

The polymeric resin may further comprise additives such as ionic or non-ionic surfactants, tackyfying resins, stabilizers, anti-oxidants, colorants, anti-fowling agents or other additives modifying the properties of the resin, the cords or the net.

The present invention also relates to a method to produce the inventive net according to the invention. Said process comprises the steps of providing the yarn, preferably a yarn comprising (HPPE) fibres, applying an aqueous suspension of the polymeric resin to the yarn before, during or after assembling the yarn into cords and a net with mesh sizes of at least 10 mm, and at least partially drying the aqueous suspension of the polymeric resin applied to the yarns to obtain a net comprising the yarns and the polymeric resin throughout the cords, optionally applying a temperature in the range from the melting temperature of the resin to 153° C. to the yarn, during and/or after at least partially drying the suspension to at least partially melt the polymeric resin, wherein the polymeric resin is a homopolymer or copolymer of ethylene and/or propylene and wherein said polymeric resin has a density as measured according to ISO1183 in the range from 860 to 970 kg/m$^3$, a peak melting temperature in the range from 40 to 140° C. and a heat of fusion of at least 5 J/g.

It has unexpectedly been found that the nets manufactured according to the method of the present invention show good robustness against cleaning, for example by cleaning the nets from bio-fouling via pressure washing, in that the nets retain their mechanical properties such as mesh strength better. The inventors found that the good performance came combined with other improvements such as a reduced ingress of foreign materials such as salt and sand into the cords of the net. Furthermore, the net according to the invention may show a unitary character of the cords which reduces the risk of damages through fish bites or handling.

In one process step of the present invention an aqueous suspension is applied to the yarns. Such application of suspension takes place before, during or after the yarns are assembled. By aqueous suspension is understood that particles of the polymeric resin are suspended in water acting as non-solvent. The concentration of the polymeric resin may widely vary and is mainly limited by the capability to formulate a stable suspension of the resin in water. A typical range of concentration is between 2 and 80 wt % of polymeric resin in water, whereby the weight percentage is the weight of polymeric resin in the total weight of aqueous suspension. Preferred concentration are between 4 and 60 wt %, more preferably between 5 and 50 wt %, most preferably between 6 and 40 wt %. Further preferred concentrations of the polymeric resin in the dispersion is at least 15 wt %, preferably at least 18 wt % and even more preferably at least 20 wt %. In another preferred embodiment the concentration of the polymeric resin in the aqueous dispersion is between 10 and 50 wt %, preferably between 15 and 40 wt %, most preferably between 18 wt % and 30 wt %, Such preferred higher concentrations of polymeric resin may have the advantage of a providing cords with higher concentration while reducing the time and energy required for the removal of the water from the cords.

The application of the suspension to the yarn may be done by methods known in the art and may depend amongst others on the moment the suspension is added to the yarns, the nature of the yarn, the concentration and viscosity of the suspension. The suspension may for example be applied to the yarns by spraying, dipping, brushing, transfer rolling or the like, especially depending on the intended amount of polymeric resin present in the cords of the inventive net. The amount of suspension present in the cords may vary widely in function of the intended application of the net and can be adjusted by the employed method but also the properties of the suspension.

Once the polymeric aqueous suspension is applied to the yarn, the impregnated yarn, preferably the net comprising the impregnated yarns, is at least partially dried. Such drying step involves the removal, e.g. the evaporation of at least a fraction of the water present in the yarns. Preferably the majority, more preferably essentially all water is removed during the drying step, optionally in combination with other components. Drying, i.e. the removal of water, may be done by methods known in the art. Typically the evaporation of water involves an increase of the temperatures of the yarn up to or above the boiling point of water. The temperature increase may be assisted or substituted by a reduction of the pressure and or combined with a continuous refreshment of the surrounding atmosphere. Typical drying conditions are temperatures of between 40 and 130° C., preferably 50 and 120° C. Typical pressure during the drying process are between 10 and 110 kPa, preferably between 20 and 100 kPa.

The process of the invention may optionally comprise a step wherein the yarn comprising the polymeric resin is heated to a temperature in the range from the melting temperature of the polymeric resin to 153° C., before, during and/or after the partially drying of the aqueous suspension. Heating of the yarn may be carried out by keeping the yarn for a dwell time in an oven set at a heating temperature, subjecting the impregnated yarn to heat radiation or contacting the yarn with a heating medium such as a heating fluid, a heated gas stream or a heated surface. Preferably, the temperature is at least 2° C., preferably at least 5° C., most preferably at least 10° C. above the peak melting temperature of the polymeric resin. The upper temperature is at most 153° C., preferably at most 150° C., more preferably at most 145° C. and most preferably at most 140° C. The dwell time is preferably between 1 minute and 6 hours, more preferably between 2 minutes and 3 hours, most preferably between 5 minutes and 2 hours. In a preferred embodiment, the heating of the yarn, the cord and/or the net of this step overlaps, more preferably is combined with the drying step of the aqueous suspension. It may prove to be practical to apply a temperature gradient to the impregnated yarn whereby the temperature is raised from about room temperature to the maximum temperature of the heating step over a period of time whereby the impregnated yarn will undergo a continuous process from drying of the suspension to at least partial melting of the polymeric resin.

The nets according to the invention may be useful for any application where the increased robustness against abrasion such as generated by a cleaning operation by hydrotreatment may be beneficial. Examples for such applications include but are not limited to coastal protection nets, hydro barrier netting, geotextile nets, fencing of animal farming installations on shore and off shore, as well as anti-thievery nets for goods. Because of their improved abrasion resistance properties, said nets can be used as sport nets such as tennis nets and soccer nets, playground equipment, bird nets, falling protection systems, drowning protection nets, cargo nets, slip protection nets but also nets acting as snow chains for vehicles. The invention therefor also concerns an article comprising the net according to the invention. More specifically the invention concerns a fishing net or a aquaculture net comprising the net of the invention, but also a fish farming construction comprising a net according to the invention connected to a frame and at least partially enclosing a volume as well as a fish farm comprising said fish farming construction.

The present invention also concerns a method of farming fish including the step of netting-off a volume of river, lake, sea or ocean water with a net according to the invention. Preferably said method comprises the steps of netting-off a volume of river, lake, sea or ocean water with a net, preferably a knotless net, according to the invention, a fishing net according to the invention or a fish farming construction according to the invention, introducing fish to the netted-off volume, providing nutrition to the fish; and harvesting the fish.

The invention will be further explained by the following examples and comparative experiment, however first the methods used in determining the various parameters useful in defining the present invention are hereinafter presented.

Measuring Methods

Titer of cord, yarn was measured by weighing an arbitrary length of cord, yarn or fiber, respectively. The titer of the cord, yarn or filament was calculated by dividing the weight by the length and is reported in either tex or dtex expressing the weight in gram per 100,000 m or 10,000 m respectively.

Heat of fusion and peak melting temperature have been measured according to standard DSC methods ASTM E 793-85 and ASTM E 794-06, respectively, at a heating rate of 10 K/min for the second heating curve and performed under nitrogen on a dehydrated sample.

The density of the polymeric resin is measured according to ISO 1183-04. Immersion method (A) and more preferably density gradient column method (B) are suitable for the present products.

The Intrinsic Viscosity (IV) is determined according to method ASTM D1601(2004) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration.

Tensile properties of yarns: tensile strength (or strength) and tensile modulus (or modulus) are defined and determined on multifilament yarns as specified in ASTM D885M, using a nominal gauge length of the fibre of 500 mm, a crosshead speed of 50%/min and Instron 2714 clamps, of type "Fibre Grip D5618C". On the basis of the measured stress-strain curve the modulus is determined as the gradient between 0.3 and 1% strain. For calculation of the modulus and tenacity, the tensile forces measured are divided by the titre, as determined above; tensile strength values in GPa are calculated including the material density as measured above. For UHMWPE fibers the density of 0.97 g/cm$^3$ is employed.

Tensile properties of fibers having a tape-like shape: tensile strength, tensile modulus and elongation at break are defined and determined at 25° C. on tapes of a width of 2 mm as specified in ASTM D882, using a nominal gauge length of the tape of 440 mm, a crosshead speed of 50 mm/min.

Tensile property and titer of monofilament fiber are measured in accordance with ISO 5079:1995, using a Textechno's Favimat (tester no. 37074, from Textechno Herbert Stein GmbH & Co. KG, Monchengladbach, Germany) with a nominal gauge length of the fibre of 50 mm, a crosshead speed of 25 mm/min and clamps with standard jaw faces (4*4 mm) manufactured from Plexiglas® of type pneumatic grip. The filament was preloaded with 0.004 N/tex at the speed of 25 mm/min. Determination of the linear density was measured according to ASTM D1577-01.

The distance between the jaws during measurements is kept at 50 mm, the monofilament being tensioned at 0.06 N/tex with a speed of 2 mm/min.

Mesh breaking strength of the net construction was determined on dry samples according to ISO 1806-2002.

Experiments

The following examples are given by way of non-limiting reference only.

A raschel knitted net was constructed from a 1760 dtex ultra-high molecular weight polyethylene yarn with a tenacity of about 32 cN/dtex (Dyneema® 1760-SK75) with each mesh leg composed of 2 SK75 yarns. The mesh size (knot to knot) was about 30 mm. A total of 4 net samples were cut from said net, each having a size of about 20×30 cm$^2$.

Net sample 1 was dipped in water and dried for 2 hours at 110° C. before being tested for mesh break strength (MBS).

Net sample 2 was dipped in water and dried for 2 hours at 110° C. before being subjected to high pressure cleaning.

Net sample 3, a comparative experiment, was dip-coated with Lago 45, an aqueous polyurethane-based suspension commercially available from I-Coats, Belgium. The polyurethane content in the suspension is 40 wt %. After dipping, net sample 2 was dried for 2 hours at 110° C. The weight increase of the dry nets was about 23 wt %.

Net sample 4, according to the invention, was dip-coated with an aqueous suspension produced by extruding a mixture of an ethylene copolymer (Queo 8210, commercially available from *Borealis*), with a density of 0.882 g/cm$^3$, a peak melting point of 73° C. and a heat of fusion of 100 J/g)

and a surfactant (Synperonic® F 108 purchased from SIGMA-ALDRICH) in a weight ratio of 3 to 1 at 100° C. under addition of water. The Queo 8210 content in the suspension was 25 wt %. After dipping, net sample 4 was dried for 2 hours at 110° C. The weight increase of the dry nets was also about 23 wt %.

Net samples 2, 3 and 4 were each subjected to identical cleaning by high pressure water jet for about 10 minutes. Here for the nets have been affixed to a wooden support. The distance between the jet nozzle and the nets was about 10 cm. The cleaning water was about 12° C. and without further additives. After drying, the net samples 2, 3 and 4 were subjected to a mesh break strength measurement. For each net the mesh break strength of 5 meshes have been tested. The results are presented in Table whereby the net sample 4 comprising a coating is according to the invention and shows a substantially higher retention of mesh breaking strength after the pressure cleaning treatment.

TABLE 1

| Net sample | 1 | 2 | 3 | 4 |
|---|---|---|---|---|
| Coating type | — | — | Lago 45 | Queo 8210 |
| Coating amount | | 0 wt % | 23 wt % | 23 wt % |
| MBS [N] | 1387 | 1048 | 1195 | 1361 |
| Strength loss | | 24.4% | 13.8% | 1.9% |

The invention claimed is:

1. A net comprising cords joined in a net mesh, wherein the cords in the net mesh are joined by knots such that the net mesh has a mesh size of at least 8 mm as measured from center to center of 2 adjacent knots of the net mesh, and wherein
each cord comprises one or more yarns, wherein the yarns comprise fibers formed of ultrahigh molecular weight (UHMWPE) fibers, and wherein the yarns have a tenacity of at least 0.6 N/tex as measured according to ASTM D885M, and wherein
the cords further comprise a polymeric resin which impregnates the one or more yarns throughout a cross-section thereof such that the polymeric resin is present between substantially all of the fibers of the one or more yarns and in contact with at least 70% of surfaces of the fibers of the one or more yarns, and wherein
the polymeric resin is a homopolymer or copolymer of ethylene and/or propylene, wherein the polymeric resin has a density as measured according to ISO1183-2004 in the range from 860 to 970 kg/m³, a peak melting temperature measured according to ASTM E794-06 in the range from 40 to 140° C. and a heat of fusion of at least 5 J/g measured according to ASTM E793-85 considering the second heating curve at a heating rate of 10 K/min, on a dry sample.

2. The net according to claim 1, wherein the resin is selected from the group consisting of:
ethylene-propylene co-polymers;
ethylene copolymers with co-monomers such as 1-butene, isobutylene;
ethylene copolymers with co-monomers with hetero atom containing monomers such as acrylic acid, methacrylic acid, vinyl acetate, maleic anhydride, ethyl acrylate, methyl acrylate;
α-olefin and cyclic olefin homopolymers and copolymers, or blends thereof; and
a copolymer of ethylene or propylene containing as co-monomers one or more olefins having 2 to 12 C-atoms, in particular ethylene, propylene, isobutene, 1-butene, 1-hexene, 4-methyl-1-pentene, 1-octene, acrylic acid, methacrylic acid and vinyl acetate.

3. The net according to claim 1, wherein the cords are braids comprising at least three yarns or laid cords comprising 3 strands, each strand comprising at least one yarn.

4. The net according to claim 1, wherein the yarns comprise filaments and/or staple fibers.

5. The net according to claim 1, wherein the UHMWPE fibers are fibers with a filament tenacity of at least 1.0 N/tex.

6. The net according to claim 1, wherein the cords comprise from 0.1 to 40 wt % of the polymeric resin, wherein wt % is the weight of polymeric resin per weight of yarn present in the cord.

7. The net according to claim 6, wherein the cords comprise from 0.5 to 30 wt % polymeric resin per weight of yarn present in the cord.

8. The net according to claim 1, wherein the cords of the net have a total yarn linear density in the range of from 1,000 to 100,000 dtex.

9. The net according to claim 1, wherein the yarns have a tenacity of at least 1.2 N/tex.

10. The net according to claim 1, wherein the yarns have a tenacity of at least 2.0 N/tex.

11. The net according to claim 1, wherein the mesh size is at least 10 mm.

12. The net according to claim 1, wherein the polymeric resin has a density as measured according to ISO1183-2004 in the range from 870 to 950 kg/m³.

13. The net according to claim 1, wherein the polymeric resin has a heat of fusion in the range from 15 to 150 J/g.

14. The net according to claim 1, wherein the polymeric resin has a peak melting temperature in the range from 50 to 130° C.

15. A sport net, playground equipment, a bird net, a falling protection system, a drowning protection net, a cargo net, a slip protection net, a snow chain for vehicles, a coastal protection net, a hydro barrier netting, a geotextile net, a net for fencing of animal farming installations on shore and off shore, or an anti-thievery net for goods comprising the net according to claim 1.

16. A fishing net or aquaculture net comprising the net according to claim 1.

17. A fish farming construction comprising a frame at least partially enclosing a volume, and the net according to claim 1 joined to the frame.

18. A fish farm comprising the fish farming construction according to claim 17.

19. A method of farming fish including the step of netting off a volume of a river, lake, sea or ocean water with the net according to claim 1.

20. The method of farming fish according to claim 19 comprising the steps of:
(a) netting-off the volume of the river, lake, sea or ocean water with the net;
(b) introducing fish to the netted off volume of water;
(c) providing nutrition to the fish; and
(d) harvesting the fish.

* * * * *